United States Patent
Kennedy

(10) Patent No.: US 9,816,620 B2
(45) Date of Patent: Nov. 14, 2017

(54) BUTTERFLY VALVE SEAL RETAINING ARRANGEMENT

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 3 days.

(21) Appl. No.: 14/547,588

(22) Filed: Nov. 19, 2014

(65) Prior Publication Data

US 2016/0138719 A1    May 19, 2016

(51) Int. Cl.
*F16K 1/226* (2006.01)
*F16K 1/20* (2006.01)
*F16J 15/18* (2006.01)

(52) U.S. Cl.
CPC ............. *F16K 1/226* (2013.01); *F16J 15/181* (2013.01); *F16K 1/2263* (2013.01); *F16K 1/2057* (2013.01)

(58) Field of Classification Search
CPC .......... F16K 1/226; F16K 1/16; F16K 1/2057; F16K 1/2263; F16J 15/181
USPC .......................... 251/306, 314, 316, 317, 362
See application file for complete search history.

(56) References Cited

U.S. PATENT DOCUMENTS

| 3,630,485 | A | * | 12/1971 | Williams | ............... | F16K 1/2263 |
| | | | | | | 251/307 |
| 4,207,135 | A | * | 6/1980 | Pavano | ................. | B29C 65/305 |
| | | | | | | 156/158 |
| 4,372,530 | A | * | 2/1983 | Livorsi | ................. | F16K 1/2263 |
| | | | | | | 251/173 |
| 4,763,877 | A | | 8/1988 | Kennedy | | |

OTHER PUBLICATIONS

Cross section definition; printed Nov. 22, 2016.*
O-ring definition; printed Nov. 22, 2016.*

* cited by examiner

*Primary Examiner* — Kevin Murphy
*Assistant Examiner* — Kelsey Rohman
(74) *Attorney, Agent, or Firm* — Brown & Michaels, PC

(57) ABSTRACT

A butterfly valve seal arrangement in a butterfly valve having a cylindrical flow channel with a wall includes a seal flange, an elastomeric seal, a seal channel, and an annular seal retaining ring. The seal flange extends into the cylindrical flow channel from the wall of the cylindrical flow channel. The seal channel is recessed into the wall of the cylindrical flow channel adjacent to the seal flange. And the annular seal retaining ring includes tabs extending into the seal channel which hold the annular seal retaining ring in the cylindrical flow channel. An elastomeric seal is held in compression in the seal channel and against the seal flange by the annular seal retaining ring, and extends into the cylindrical flow channel forming a seal surface held in compression against a vane seat of a vane in a position perpendicular to a direction of flow.

15 Claims, 9 Drawing Sheets

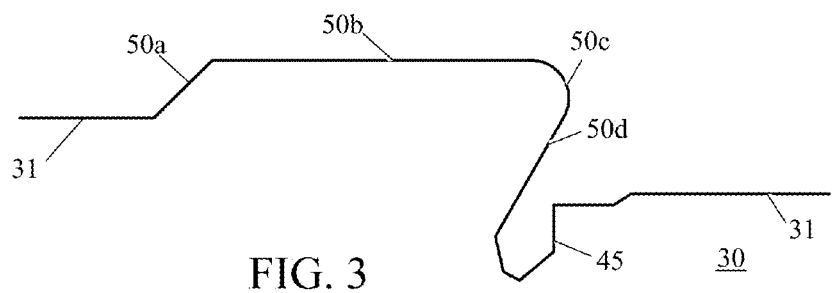
FIG. 3
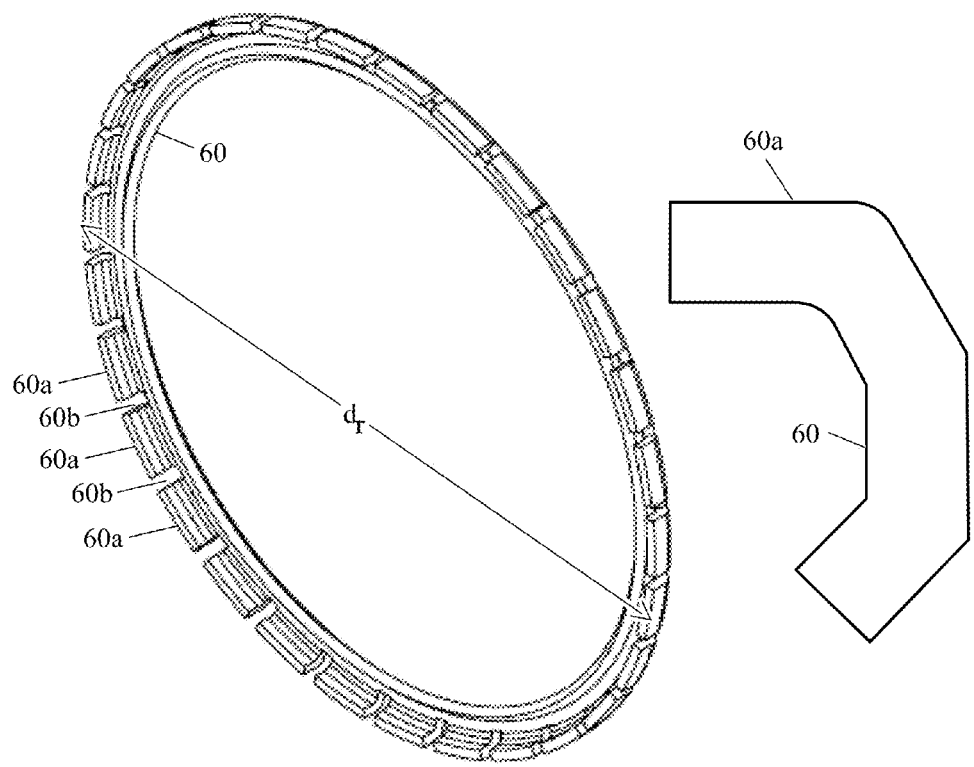
FIG. 4A                    FIG. 4B

BUTTERFLY VALVE SEAL RETAINING ARRANGEMENT

BACKGROUND OF THE INVENTION

Field of the Invention

The invention pertains to the field of butterfly valve seals. More particularly, the invention pertains to mechanically retained butterfly valve seals.

Description of Related Art

Butterfly valves generally include a hollow valve body with an inlet and an outlet, and cylindrical flow channel passing between the inlet and the outlet. A vane is rotatably mounted between the inlet and the outlet on an operating stem passing laterally through the hollow valve body. When the operating stem is rotated, the vane may be rotated between a first position perpendicular to a flow direction between the inlet and the outlet, and a second position parallel to the flow direction. An annular elastomeric seal mounted circumferentially in the cylindrical flow channel at the location of the vane mates with a seat ring on the vane when the vane is in the first position, creating a fluid tight seal between the vane and the cylindrical flow channel of the hollow valve body.

In the prior art, various constructions have been used to mount the elastomeric seal in the cylindrical flow channel. In some constructions, the elastomeric seal is bonded to a channel formed in a surface of the cylindrical flow channel using adhesives. Such constructions, however, do not facilitate field replacement of the elastomeric seal, and also may not provide for adjustment of the elastomeric seal. Additionally, experience has shown that bonded elastomeric seal interfaces may fail under high flow velocity conditions.

In other prior art constructions, the elastomeric seal is compressed into a seal channel and against a seal flange by a retaining ring connected to the seal flange using a number of bolts or screws. This arrangement allows for field replacement of the elastomeric seal, and also for adjustment of the elastomeric seal by changing the torque on the screws or bolts holding the retaining ring, and thus the compression of the elastomeric seal between the retaining ring and the seal flange. This type of construction increases machining required during construction of the hollow valve body, and therefore also manufacturing costs.

An elastomeric seal arrangement described by Kennedy (U.S. Pat. No. 4,763,877, issued 1988) also uses an elastomeric seal compressed into a seal channel and against a seal flange by a retaining ring. In this construction, the retaining ring is held in place by at least three J-shaped clips. The elastomeric seal is first placed in the seal channel. The retaining ring is then located next to the elastomeric seal, and pressure is applied to the retaining ring to compress the elastomeric seal, and move the retaining ring past a channel formed in the surface of cylindrical flow channel.

A long end of the J-shaped clips is received by the groove in the surface of the cylindrical flow channel, and a short end of the J-shaped clips is received by a first groove in the retaining ring. When pressure is removed from the retaining ring, the elastomeric seal decompresses and forces the retaining ring against the J-shaped clips. The long end of the J-shaped clips is in turn forced against a side of the groove in the surface of the cylindrical flow channel, holding the J-shaped clips in place. A point-punch may be used to create a deformation of the J-shaped clips into a second groove formed in the retaining ring, so that the J-shaped clips may only be removed using considerable force. The elastomeric seal may be adjusted by inserting a shim between the long end of the J-shaped clips and the side of the channel in the surface of the cylindrical flow channel, thus increasing the compression of the elastomeric seal into the seal channel and against seal flange.

The annular elastomeric seals used in the prior art are generally formed using extrusion or molding techniques to produce an annular seal with a given cross-sectional profile. However, this method of construction limits the types of elastomers that may be used to form the elastomeric seals because not all elastomeric materials lend themselves to these manufacturing techniques. As a result, butterfly valves used to regulate flow in fluid systems carrying aggressive chemicals may require short service intervals between elastomeric seal replacements. For example, in clean water treatment facilities that use concentrated sterilization fluids to clean piping systems, improper flushing of the sterilization fluids after a cleaning cycle may lead to rapid elastomeric seal degeneration, and failure of elastomeric seals.

SUMMARY OF THE INVENTION

A butterfly valve includes a hollow valve body with an inlet, an outlet, and a cylindrical flow channel with a wall passing between the inlet and the outlet. A rotatable operating stem passes laterally through the hollow valve body and cylindrical flow channel at a location between the inlet and the outlet.

A vane with a vane seat formed about a circumference of the vane is located in the cylindrical flow channel and mechanically coupled to the rotatable operating stem such that the vane is rotatable from a first orientation perpendicular to a flow direction between the inlet and the outlet, and a second orientation away from perpendicular to the flow direction.

A valve seal arrangement includes a seal flange, a seal channel in the wall of the cylindrical flow channel, an elastomeric seal, and an annular seal retaining ring.

The seal flange extends radially into the cylindrical flow channel of the hollow valve body from the wall of the cylindrical flow channel adjacent to the vane seat of the vane when the vane is in the first orientation.

The seal channel includes a first side, a second side, and a third side formed in the wall of the cylindrical flow channel. The first side is adjacent to the seal flange, the second side is recessed into the wall of the cylindrical flow channel of the hollow valve body, and the third side is opposite the first side.

The annular seal retaining ring has a series of tabs extending from an outer circumference into the seal channel. An interface between the tabs and the third side of the seal channel holds the annular seal ring in the cylindrical flow channel opposite the seal flange and defines a space between the annular seal ring and the seal flange.

The elastomeric seal is held in the seal channel between the annular seal retaining ring and the seal flange, with the elastomeric seal extending into the cylindrical flow channel through the space defined between the annular seal ring and the seal flange, and forms a seal surface held compression against the vane seat of the vane when the vane is in the first position.

In one embodiment, the elastomeric seal is an O-ring, with a circular cross-section in an uncompressed first state, held in a compressed second state between the annular seal retaining ring and the seal flange. The O-ring elastically deforms to the first side of the seal channel, the second side of the seal channel and the tabs of the annular seal retaining ring, and also elastically deforms through the space defined between the annular seal ring and the seal flange, and into the cylindrical flow channel of the hollow valve body to form the seal surface held compression against the vane seat of the vane when the vane is in the first position.

The O-ring is installed in the seal channel in an uncompressed state. The annular seal retaining ring is then introduced into the cylindrical flow channel of the hollow valve body. Initially the tabs of the annular seal retaining ring are perpendicular to the annular seal ring, so that the annular seal ring may pass through the cylindrical flow channel. An annular press die is used to compress the O-ring been the annular seal retaining ring and the seal flange, and into the seal channel, while moving the annular seal retaining ring toward the seal flange. An annular expansion die surrounding the annular press die then bends the tabs of the annular seal retaining ring into the seal channel.

When the annular expansion die and the annular press die are removed from the cylindrical flow channel, the elastomeric seal expands and an interface between the tabs of the annular seal retaining ring and the third side of the seal channel holds the annular retaining ring in place.

BRIEF DESCRIPTION OF THE DRAWINGS

FIG. 3 shows a detail of a seal channel and seal flange in the surface of a cylindrical flow channel noted as 3 in FIG. 2

FIG. 4A shows a perspective of an annular seal retaining ring with tabs.

FIG. 4B shows a cross-sectional profile along a radius of the annular seal retaining ring with tabs.

DETAILED DESCRIPTION OF THE INVENTION

A butterfly valve seal arrangement of the type described herein provides several advantages over the prior art. An elastomeric seal is preferably formed from commercially available bulk O-ring cord, which results in a broader range of elastomeric materials being available to choose from in constructing the elastomeric seal, allowing the construction of elastomeric seals that are more compatible with a range of aggressive fluids. Additionally, the elastomeric seal provides greater resistance to butterfly disk movement and high flow velocity drag that may otherwise cause an elastomeric seal to be pulled from its working location over time.

Figure 1:
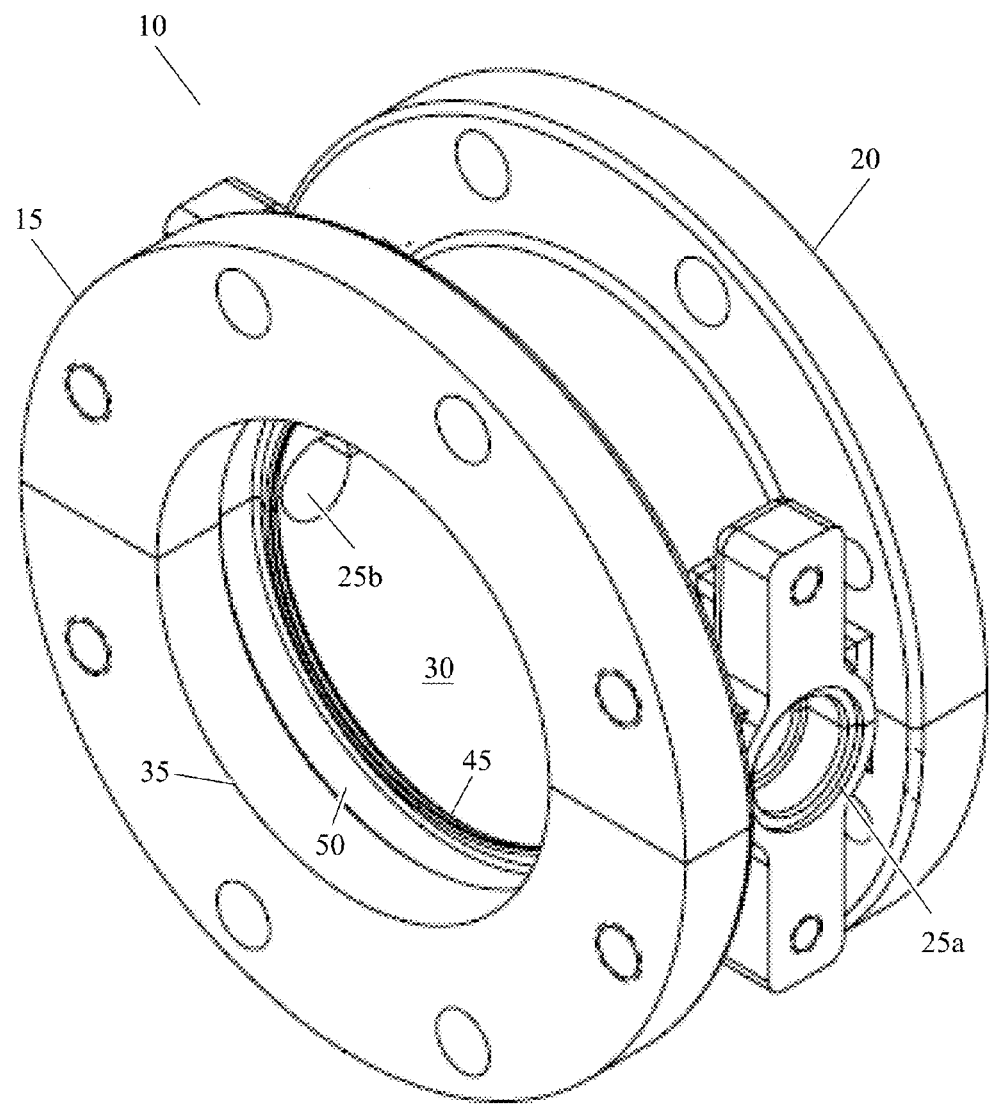
FIG. 1 shows a perspective of a hollow valve body of a butterfly valve.

FIG. 1 shows a hollow valve body 10 of a butterfly valve. The hollow valve body 10 has a first end with an inlet 35, and an inlet flange 15 surrounding the inlet 35 for attachment to a piping system. A second end of the hollow valve body 10 has an outlet, and an outlet flange 20 for attachment to a piping system. A cylindrical flow channel 30 between the inlet 35 and the outlet is defined by a generally cylindrical wall internal to the hollow valve body 10. The hollow valve body 10 is provided with a first stem aperture 25a and a second stem aperture 25b at opposing sides of the hollow valve body 10. The first stem aperture 25a and a second stem aperture 25b are in alignment such that an operating stem may pass through first stem aperture 25a, an aperture in a butterfly disk, and the second stem aperture 25b. A seal flange 45 and seal channel 50 are also shown.

Figure 2:
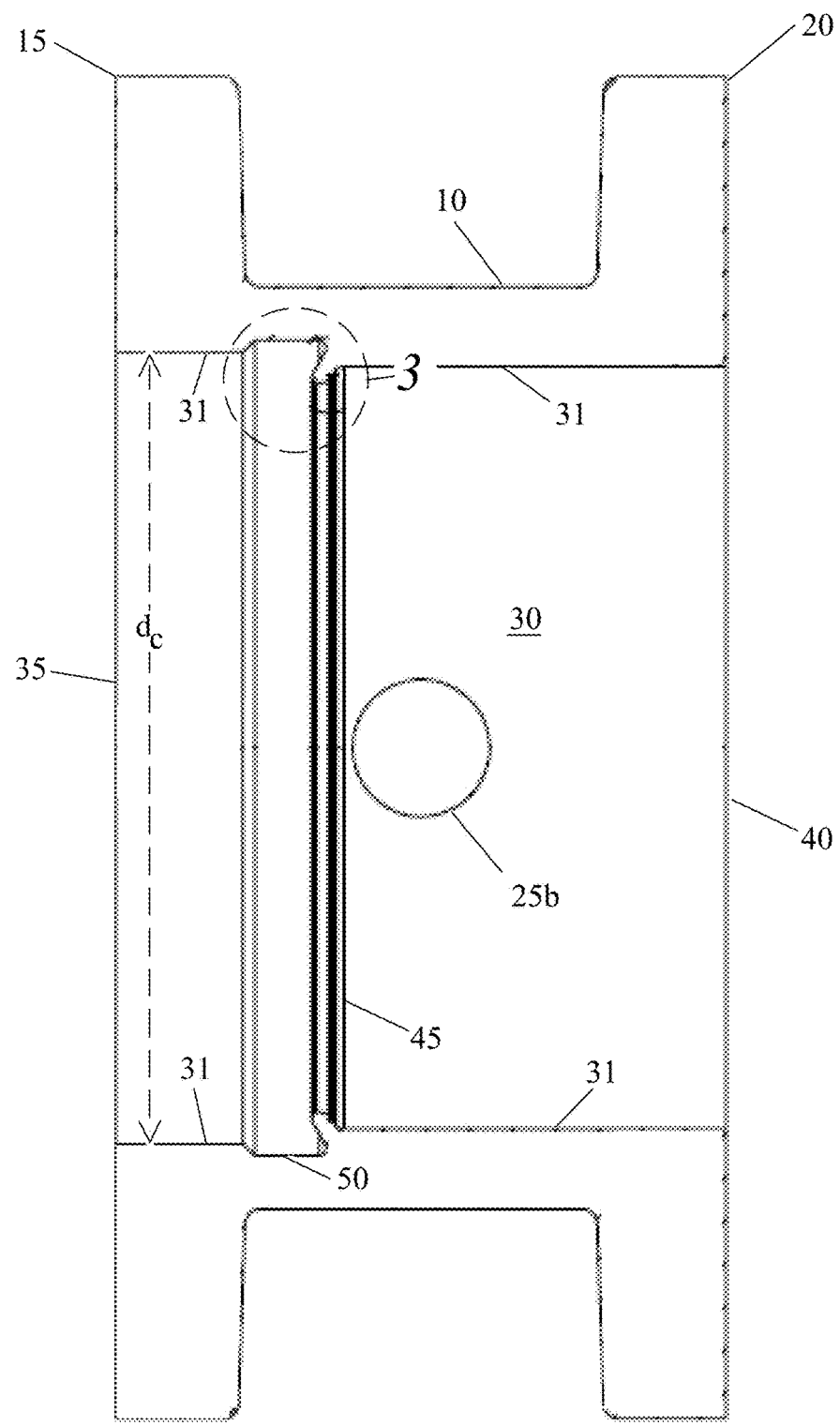
FIG. 2 shows a cross-section through a hollow valve body of a butterfly valve.

FIG. 2 shows a cross-section through the hollow valve body 10 from the inlet 35 to the outlet 40. The seal flange 45 extends radially into the cylindrical flow channel 30 from a wall 31 of the cylindrical flow channel 30, and adjacent the first stem aperture 25a (not shown in this view) and second stem aperture 25b. A seal channel 50 is formed in the wall 31 of the cylindrical flow channel 30 adjacent the seal flange 45. The cylindrical flow channel 30 between the seal channel 50 and the inlet 35 has a diameter $d_c$.

The seal channel 50 has a profile in the wall 31 of the cylindrical flow channel 30, indicated by 3 in FIG. 2, and shown in greater detail in FIG. 3. The profile of the seal channel 50 includes a first angled 50a segment, a straight segment 50b, an arcuate segment 50c, and a second angled segment 50d, together forming a generally dove-tail shape for the seal channel 50. In this embodiment, the first side of the seal channel is formed by the second angled segment 50d and the arcuate segment 50c, the second side of the seal channel is formed by the straight segment 50b, and the third side of the seal channel is formed by the first angled segment 50a.

The seal flange 45 has a first side that is coincident with the second angled segment 50d of the seal channel 50, and a second side opposite the first side toward the outlet 40 of the hollow valve body 10.

FIG. 4A shows a perspective of an annular seal retaining ring 60 with an outer diameter $d_r$. A series of tabs 60a are formed about the outer circumference of the annular seal retaining ring 60, with adjacent tabs 60a being separated by gaps 60b. A cross-sectional profile of the annular seal retaining ring 60 along a radius of the annular seal retaining ring is shown in FIG. 4B, and illustrates that the tabs 60a are generally perpendicular to the annular seal retaining ring 60. The annular seal retaining ring 60 is, in one embodiment, made of stainless steel, and stamped from sheet stock. However, any other material, such as aluminum or brass, for example, that is compatible with fluids passing through the butterfly valve, and that may be formed into the shape of the annular seal retaining ring 60, may also be used.

In one embodiment, an elastomeric seal is formed from an O-ring, which can be made from commercially available bulk O-ring cord, or could be purchased as a commercially available finished O-ring. The O-ring may be constructed from any elastomeric material known in the art, including, but not limited to, silicon rubber, nitrile rubber, ethylene propylene diene monomer (EPDM) rubber, or Viton® fluoroelastomer. An elastomeric seal of any desired diameter may be constructed by cutting a segment of O-ring cord to an appropriate length and joining the two ends of the segment of O-ring cord using any method known in the art and appropriate to the elastomeric material chosen. In a non-compressed state, the O-ring cord, and the elastomeric seal constructed from the O-ring cord, has a circular cross-sectional profile in one embodiment. In other embodiments, the O-ring may have a pre-formed cross-sectional profile.

Figure 5A:
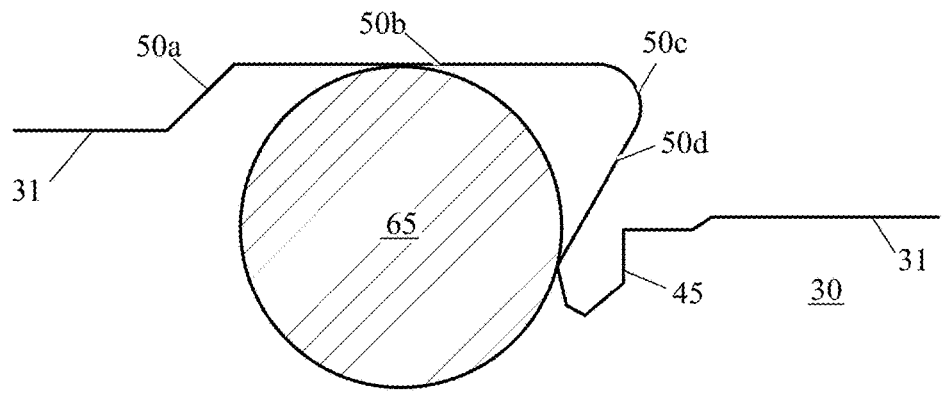
FIG. 5A shows an O-ring with a circular cross-sectional profile inserted into a seal channel.
Figure 5B:
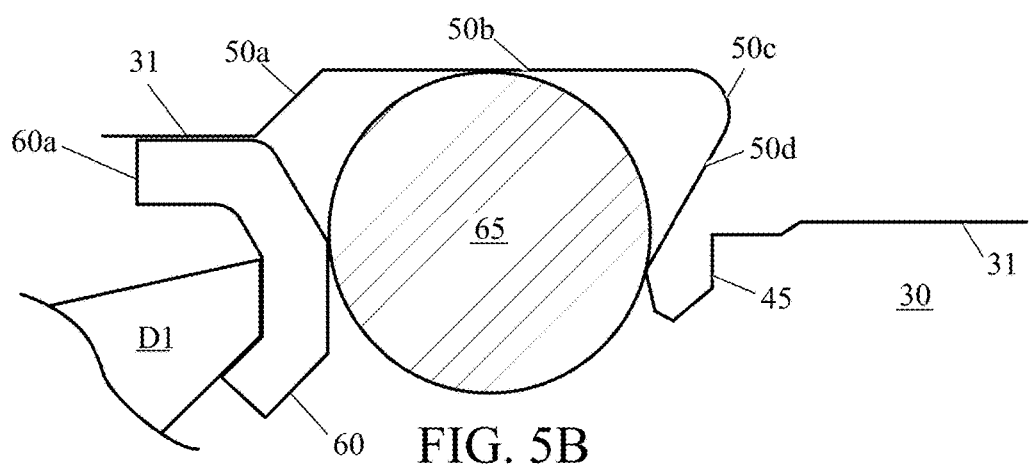
FIG. 5B shows a profile an annular press die inserted into an annular seal retaining ring with tabs.

The elastomeric seal is installed in the hollow valve body 10 as shown in FIGS. 5A-5F. As shown in FIG. 5A, the elastomeric seal 65 is first inserted into the cylindrical flow channel 30 in an uncompressed state, and fitted into the seal channel 50 and against the seal flange 45. The diameter $d_r$ of the annular seal retaining ring 60 is slightly less than the diameter $d_c$ of the cylindrical flow channel 30, allowing the annular seal retaining ring 60 to be slid into the inlet 35, and through the cylindrical flow channel 30. As shown in FIG. 5B, the annular seal retaining ring 60 is thus located so that the annular seal retaining ring 60 abuts the uncompressed elastomeric seal 65. An annular press die D1 with a radial cross-sectional profile similar to the profile shown in FIG. 5B is inserted into the cylindrical flow channel 30, and pressed against the annular seal retaining ring 60, such that the a uniform pressure is applied to the annular seal retaining ring 60 about a circumference of the annular seal retaining ring 60, and toward the seal flange 45.

Figure 5C:
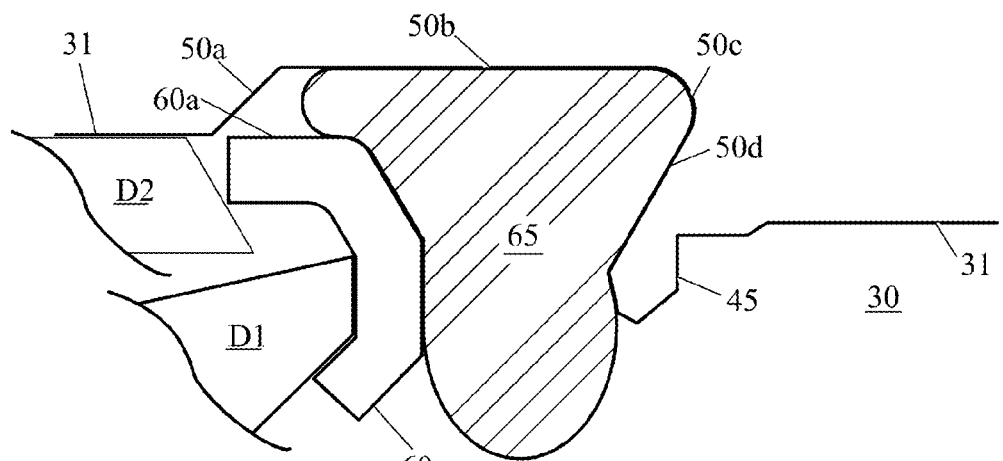
FIG. 5C shows a profile an annular press die compressing an annular seal retaining ring against and O-ring, and an annular expansion die inserted into a cylindrical flow channel.

As shown in FIG. 5C, when pressure is applied to the annular press die D1, for example, using a hydraulic press, the elastomeric seal 65 elastically deforms into the seal channel 50, against the seal flange 45, and against the annular seal retaining ring 60. For the purposes of the description contained herein, "elastic deformation" is defined as the property of a material which, when the material is in a first resting state with a first shape, allows the material to deform to a second state with a second shape when an external force is applied to the material, and return to the first resting state with a first shape when the external force is no longer applied to the material. In other words, a material having been elastically deformed, and held in the second state with the second shape, will be biased to return to the first state with the first shape, until an external force causing the deformation is removed, and the material fully relaxes to the first state with the first shape.

The annular seal retaining ring 60 is pressed against the elastomeric seal 65 until the tabs 60a of the annular seal retaining ring 60 are adjacent first angled segment 50a of the seal channel 50. When the annular seal retaining ring 60 is at the position shown in FIG. 5C, an annular expansion die D2 that is concentric to, and surrounding the annular compression die D1, with radial cross-sectional profile similar to that shown in FIG. 5C, is moved into the cylindrical flow channel 30 toward the seal flange 45.

Figure 5D:
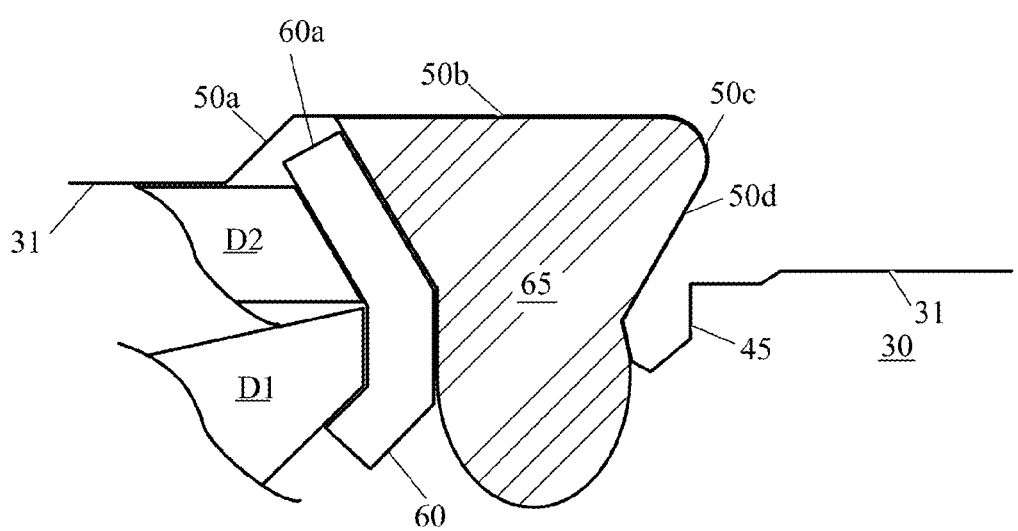
FIG. 5D shows a profile of an annular expansion die bending a tab of an annular seal retaining ring into a seal channel.
Figure 5E:
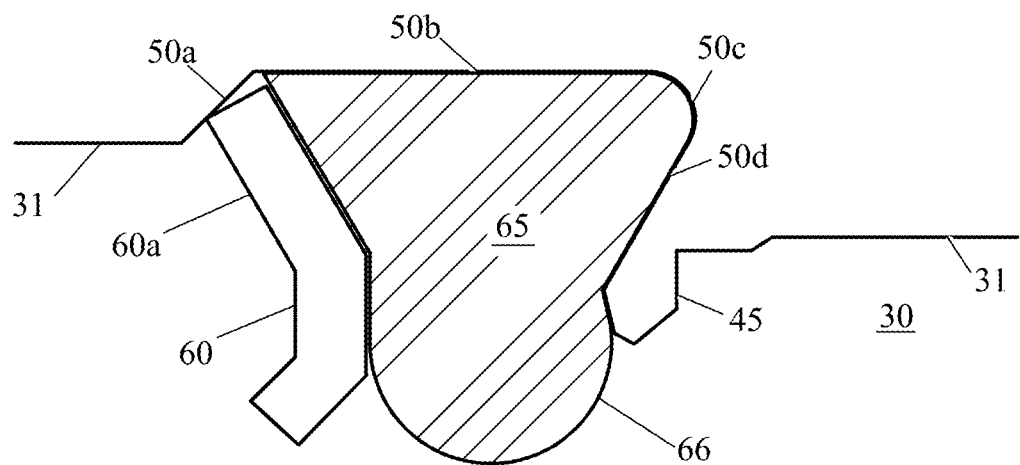
FIG. 5E shows an annular seal retaining ring with tabs after installation in a seal channel.

As shown in FIG. 5D, as the annular die D2 moves toward the seal flange 45, the annular die D2 contacts the tabs 60a of the annular seal retaining ring 60, and bends the tabs 60a into the seal channel 50. As shown in FIG. 5E, when the annular press die D1 and annular expansion die D2 are removed from the cylindrical flow channel 30, the elastomeric seal 65, being biased to return to a first state with a circular cross-sectional profile, expands and forces the annular seal retaining ring 60 toward the inlet 35 until the tabs 60a contact the first angled segment 50a of the seal channel 50.

Further motion of the annular seal retaining ring toward the inlet 35 is thus prevented, and the elastomeric seal 65 is held in the dove-tail, being wider at straight segment 50b than at the wall 31 of the cylindrical flow channel 30, of the seal channel 50 formed by the straight segment 50b, the arcuate segment 50c, and the second angled segment 50d of the seal channel 50, as well as the annular seal retaining ring 60, and the tabs 60a being bent into the seal channel 50. A portion of the elastomeric seal 65 elastically deforms into the cylindrical flow channel 30 and defines a seal surface 66.

Figure 5F:
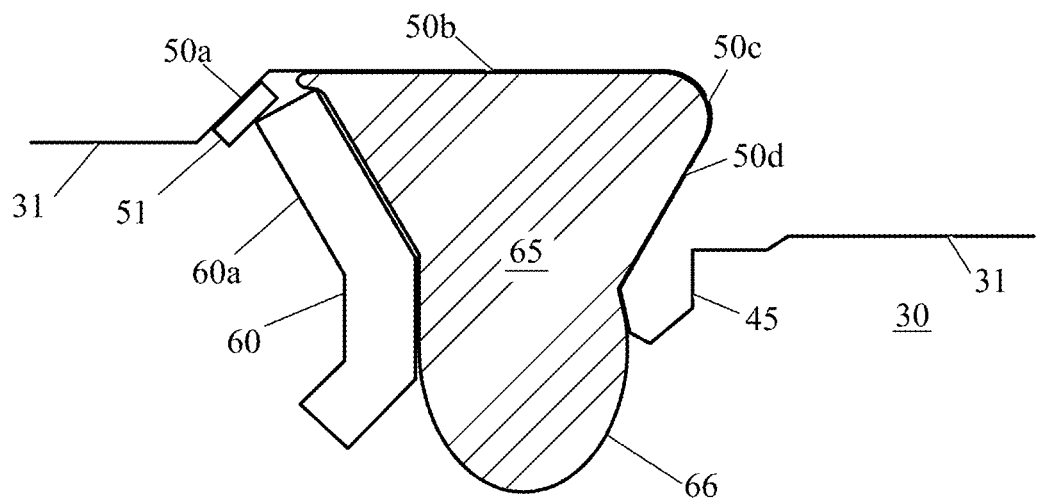
FIG. 5F shows an annular seal retaining ring with tabs after installation in a seal channel including an adjustment shim.

As shown in FIG. 5F, the seal surface 66 may be adjusted, if desired, by placing a shim 51 at an interface between the tabs 60a of the annular seal retaining ring 60, and the first angled segment 50a of the seal channel 50.

The elastomeric seal 65 is held in a state of elastic deformation in the seal channel 50 by the annular seal retaining ring 60. The elastomeric seal 65 is therefore biased to return to the circular cross-sectional profile of the elastomeric seal 65 prior to being compressed by the annular seal retaining ring 60. As a result, the elastomeric seal 65 is biased to fill the seal channel 50 and be forced against the annular seal retaining ring 60 and tabs 60a.

When a force is applied to the seal surface 66 of elastomeric seal 65 that may tend to roll the elastomeric seal 65 out of the seal channel 50, the force is opposed by the elastic deformation properties of the elastomeric seal 65, which bias the elastomeric seal 65 to return to a circular profile more closely approximated by the seal channel 50, rather than a profile that may allow the elastomeric seal 65 to move between the seal flange 45 and the annular seal retaining ring 60, and become dislodged.

Similarly, in the event the elastomeric seal 65 is drawn a small distance out of the space between the seal flange 45 and the annular seal retaining ring 60, the elastic deformation properties of the elastomeric seal 65 cause the elastomeric seal 65 to be self-seating and return to the seal channel 50, as the elastomeric seal 65 is biased to return to a circular profile which is more closely approximated by the dove-tail space formed by the straight segment 50b, the arcuate segment 50c, and the second angled segment 50d of the seal channel 50, as well as the annular seal retaining ring 60, and the tabs 60a being bent into the seal channel 50.

Figure 6:
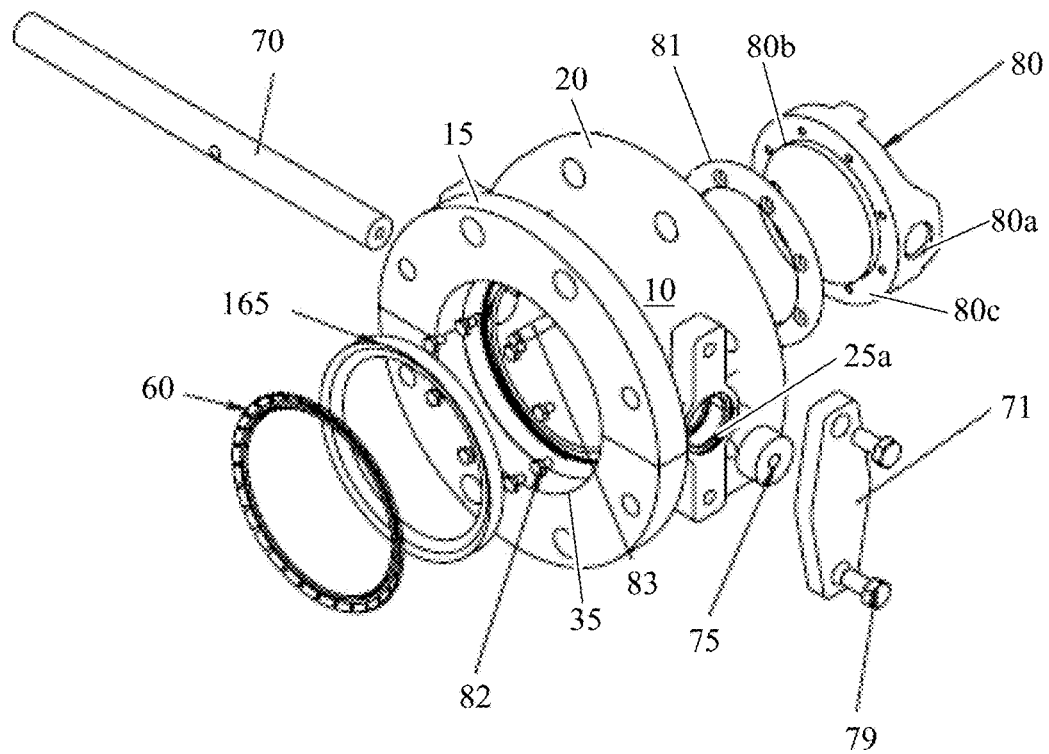
FIG. 6 shows an exploded view of a butterfly valve.

FIG. 6 shows an exploded view of a butterfly valve incorporating a butterfly valve seal arrangement described herein. The butterfly valve includes a hollow valve body 10 with an inlet 35, an inlet flange 15, an outlet flange 20, first stem aperture 25a, and other elements previously described in FIGS. 1-2. The elastomeric seal 165 and annular seal retaining ring 60 are inserted into the inlet 35 and fixed in the hollow valve body as previously described in FIGS. 5A-5F. In this figure the elastomeric seal 165 in an O-ring that has a pre-formed cross-sectional profile, and may be installed in the seal channel 50 in the same manner as previously described herein for an elastomeric seal 65 that is an O-ring with a circular cross-sectional profile.

A vane 80 includes a vane aperture 80a for receiving an operating stem 70. The vane 80 has a vane face 80b with a recess 80c machined about a circumference of the vane face 80b for receiving a vane seat 81. The vane seat 81 is received by the recess 80c machined in the vane face 80b, and is held in place with screws 82, bolts, rivets, welds, or other types of fastener. The vane seat 81 is made of stainless steel in one embodiment, but may also be formed from other materials that are compatible with fluids flowing through the butterfly valve, and other butterfly valve materials, including but not limited to bronze, aluminum, nickel allow, composite materials, and plastics.

The assembled vane seat 81 and vane 80 are inserted into the hollow valve body 10 through the outlet 40, not shown in this view, and moved to a location in the hollow valve body 10 with the vane seat 81 contacting the seal surface 66 of the installed elastomeric seal 65. An operating stem 70 is then inserted through the second stem aperture 25b, through the vane aperture 80a, and into the first stem aperture 25a. A vane retaining pin 83 passes through the vane 80 and the operating stem 70 so that the vane 80 and the operating stem 70 are mechanically coupled, both rotationally, and longitudinally along a length of the operating stem 70. A bushing 75 is inserted into the first stem aperture 25a from the exterior of the hollow valve body 10, and is held in contact with an end of the operating stem 70 inside the first stem aperture 25a by a first stem cap 71. The first stem cap 71 is held in place by fasteners, such as screws 79 or bolts, for example. A second stem cap, not shown in this figure, seals the second stem aperture 25b, with the operating stem 70 passing through the second stem cap.

Figure 7:
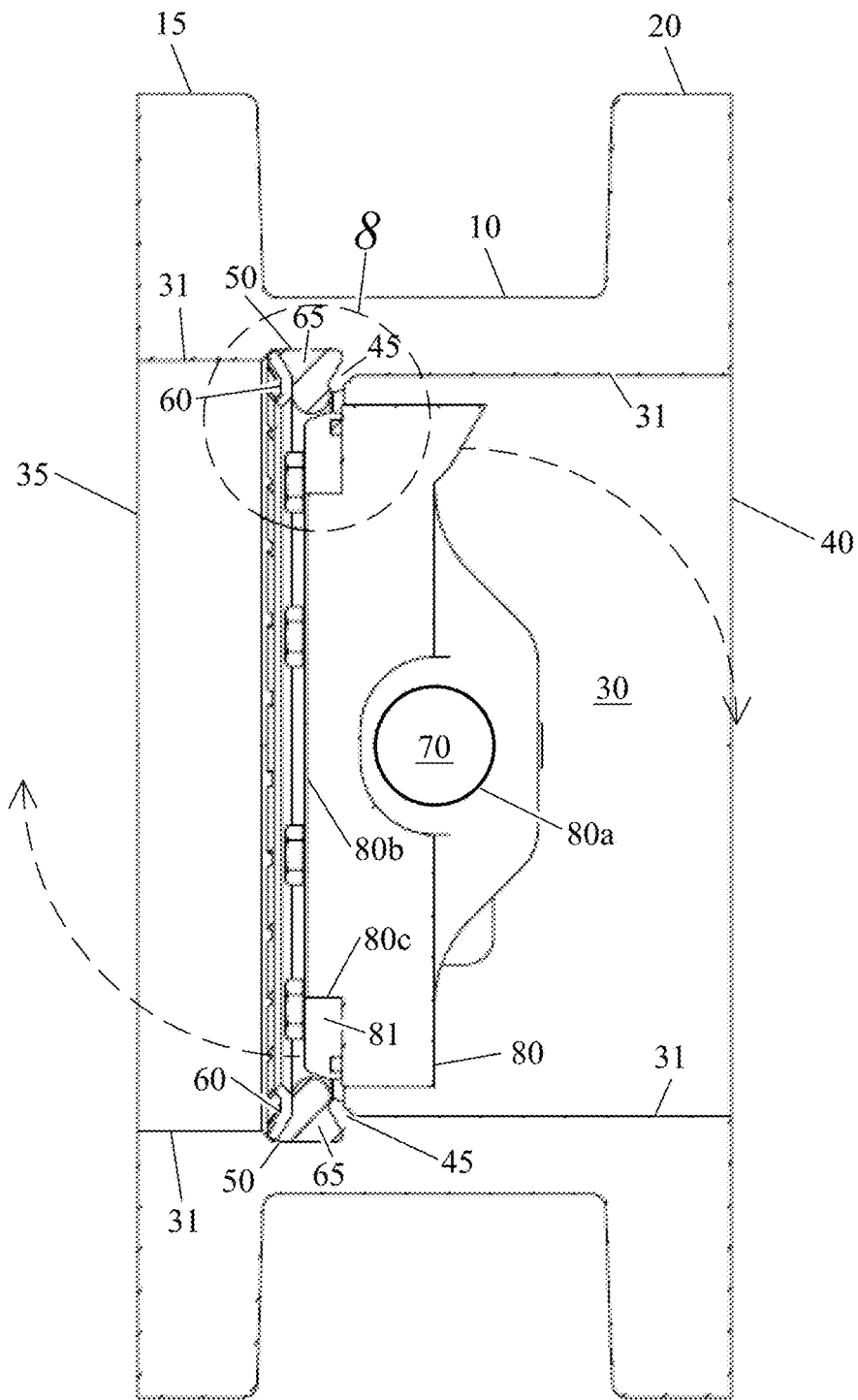
FIG. 7 shows a cross-section of a butterfly valve.

FIG. 7 illustrates a longitudinal cross-section of an assembled butterfly valve having a valve seal arrangement as described herein. The vane 80 is shown in a first orientation, closing the butterfly valve and blocking flow of a fluid from the inlet 35 to the outlet 40 through the cylindrical flow channel 30. In this first orientation, the vane seat 81 is in contact with the elastomeric seal 65 about a circumference of the vane seat. The vane 80 may be moved to a second orientation allowing a fluid to flow through the cylindrical flow channel by rotating the operating stem 70, and consequently the vane 80 mechanically coupled to the operating stem, as indicated by the dashed arrows in FIG. 7. As the operating stem 70 is rotated, a first half of the vane 80 rotates toward the outlet 40 and away from the elastomeric seal 65. At the same time, a second half of the vane 80 rotates past the elastomeric seal 65 and away from the elastomeric seal 65 toward the inlet 35. The operating stem 70 may be rotated by any means known in the art, including, but not limited to, worm gear drives and actuator levers.

Figure 8:
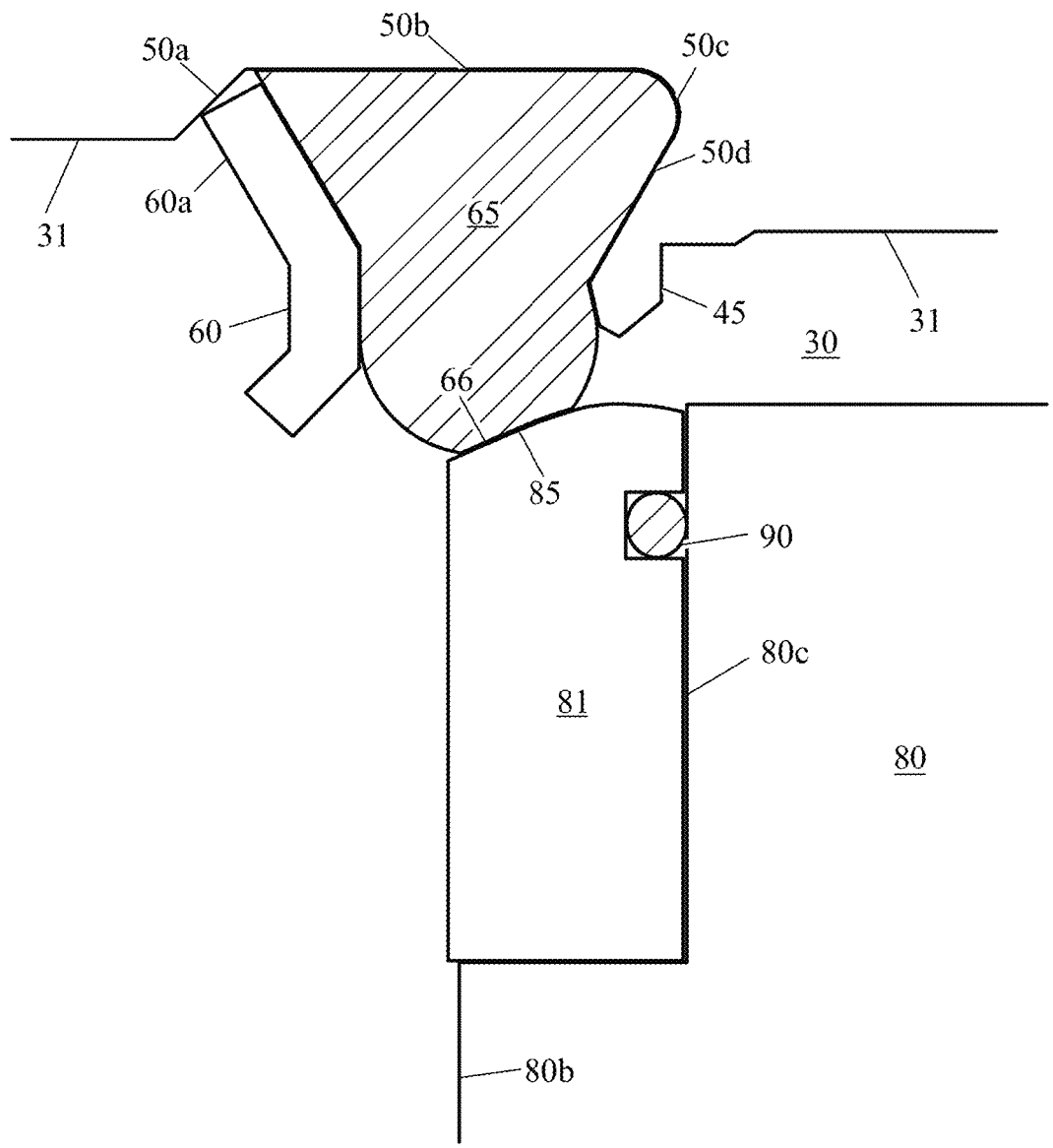
FIG. 8 shows a detail of a butterfly valve seal and vane indicated by 8 in FIG. 7.

FIG. 8 illustrates the seal arrangement and vane 80 in more detail, as indicated by the reference 8 in FIG. 7. The elastomeric seal 65 is shown installed in the seal channel 50 as previously described in FIGS. 5A-5F. The vane seat 81 is mounted in a recess 80c in the vane 80. An O-ring 90 or other seal may be incorporated between the vane seat 81 and the vane 80 to prevent fluid from leaking between the vane seat 81 and the vane 80. A seat surface 85 is formed at an outer circumference of the vane seat 81. When the vane 80 is in the first orientation, closing the butterfly valve, the seat surface 85 contacts the elastomeric seal 65 at the seal surface 66. Elastomeric compression of the elastomeric seal 65 at the seal surface 66 by the seat surface 85 forms a fluid tight seal at the interface between the seal surface 66 and the seat surface 86.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A valve seal arrangement in a butterfly valve having a hollow valve body with an inlet, an outlet, and a cylindrical flow channel with a wall passing between the inlet and the outlet, a rotatable operating stem passing laterally through the hollow valve body and cylindrical flow channel of the hollow valve body at a location between the inlet of the hollow valve body and the outlet of the hollow valve body, a vane with a vane seat formed about a circumference of the vane, the vane being located in the cylindrical flow channel of the hollow valve body and mechanically coupled to the rotatable operating stem, and rotatable from a first orientation perpendicular to a flow direction between the inlet of the hollow valve body and the outlet of the hollow valve body and a second orientation away from perpendicular to the flow direction between the inlet of the hollow valve body and the outlet of the hollow valve body, the valve seal arrangement comprising:
   a) a seal flange extending radially into the cylindrical flow channel of the hollow valve body from the wall of the cylindrical flow channel of the hollow valve body adjacent to the vane seat of the vane when the vane is in the first orientation;
   b) a seal channel with a first side, a second side, and a third side formed in the wall of the cylindrical flow channel of the hollow valve body, the first side being adjacent to the seal flange, the second side being recessed into the wall of the cylindrical flow channel of the hollow valve body, and the third side being opposite the first side;
   c) an annular seal retaining ring having a plurality of tabs extending from an outer circumference of the annular seal retaining ring into the seal channel, with an interface between the tabs and the third side of the seal channel holding the annular seal ring in the cylindrical flow channel of the hollow valve body opposite the seal flange and defining a space between the annular seal ring and the seal flange; and
   d) an elastomeric seal held in the seal channel between the annular seal retaining ring and the seal flange, with the elastomeric seal extending into the cylindrical flow channel through the space defined between the annular seal ring and the seal flange and forming a seal surface held in compression against the vane seat of the vane when the vane is in the first orientation;
   wherein the elastomeric seal is an O-ring having a circumference and a cross-sectional profile along the circumference, the cross-sectional profile being perpendicular to a plane defined by the circumference, the cross-sectional profile being in the shape of at least 90% of a circle when the elastomeric seal is in an uncompressed first state, and when the elastomeric seal is held in a compressed second state between the annular seal retaining ring and the seal flange, the elastomeric seal elastically deforms through the space defined between the annular seal ring and the seal flange and into the flow channel of the hollow valve body to form the seal surface held compressed against the vane seat of the vane when the vane is in the first orientation.

2. The valve seal arrangement of claim 1, wherein the O-ring is formed from a length of O-ring cord having a first end and a second end with the first end being bonded to the second end.

3. The valve seal arrangement of claim 1, further comprising a shim between the third side of the seal channel and the tabs of annular seal retaining ring.

4. The valve seal arrangement of claim 1, wherein the seal channel has a dove-tail shape.

5. The valve seal arrangement of claim 1, wherein the annular seal retaining ring has a retaining ring outer diameter, wherein the inlet has an inlet diameter, and wherein the retaining ring outer diameter is smaller than the inlet diameter.

6. The valve seal arrangement of claim 1, wherein the cross-sectional profile is entirely in the shape of a circle.

7. The valve seal arrangement of claim 1, wherein the outer circumference of the annular seal retaining ring is an outermost circumference of the annular seal retaining ring.

8. A butterfly valve comprising:
a) a hollow valve body having an inlet, an outlet, and a cylindrical flow channel with a wall passing between the inlet and the outlet;
b) a rotatable operating stem passing laterally through the hollow valve body and cylindrical flow channel of the hollow valve body at a location between the inlet of the hollow valve body and the outlet of the hollow valve body;
c) a vane with a vane seat formed about a circumference of the vane, the vane being located in the cylindrical flow channel of the hollow valve body, mechanically coupled to the rotatable operating stem, and rotatable from a first orientation perpendicular to a flow direction between the inlet of the hollow valve body and the outlet of the hollow valve body, and a second orientation away from perpendicular to the flow direction between the inlet of the hollow valve body and the outlet of the hollow valve body;
d) a seal flange extending radially into the cylindrical flow channel of the hollow valve body from the wall of the cylindrical flow channel of the hollow valve body adjacent to the vane seat of the vane when the vane is in the first orientation;
e) a seal channel with a first side, a second side, and a third side formed in the wall of the cylindrical flow channel of the hollow valve body, the first side being adjacent to the seal flange, the second side being recessed into the wall of the cylindrical flow channel of the hollow valve body, and the third side being opposite the first side;
f) an annular seal retaining ring having a plurality of tabs extending from an outer circumference of the annular seal retaining ring into the seal channel, with an interface between the tabs and the third side of the seal channel holding the annular seal retaining ring in the cylindrical flow channel of the hollow valve body opposite the seal flange and defining a space between the annular seal retaining ring and the seal flange; and
g) an elastomeric seal held in the seal channel between the annular seal retaining ring and the seal flange, the elastomeric seal extending into the cylindrical flow channel through the space defined between the annular seal ring and the seal flange and forming a seal surface held in compression against the vane seat of the vane when the vane is in the first orientation;
wherein the elastomeric seal is an O-ring having a circumference and a cross-sectional profile along the circumference, the cross-sectional profile being perpendicular to a plane defined by the circumference, the cross-sectional profile being in the shape of at least 90% of a circle when the elastomeric seal is in an uncompressed first state, and when the elastomeric seal is held in a compressed second state between the annular seal retaining ring and the seal flange, the elastomeric seal elastically deforms through the space defined between the annular seal ring and the seal flange and into the flow channel of the hollow valve body to form the seal surface held compressed against the vane seat of the vane when the vane is in the first orientation.

9. The butterfly valve of claim 8, wherein the O-ring is formed from a length of O-ring cord having a first end and a second end with the first end being bonded to the second end.

10. The butterfly valve of claim 8, further comprising a shim between the third side of the seal channel and the tabs of annular seal retaining ring.

11. The butterfly valve of claim 8, wherein the seal channel has a dove-tail shape.

12. The butterfly valve of claim 8, wherein the annular seal retaining ring has a retaining ring outer diameter, wherein the inlet has an inlet diameter, and wherein the retaining ring outer diameter is smaller than the inlet diameter.

13. The butterfly valve of claim 8, wherein the cross-sectional profile is entirely in the shape of a circle.

14. The butterfly valve of claim 8, wherein the outer circumference of the annular seal retaining ring is an outermost circumference of the annular seal retaining ring.

15. A valve seal arrangement in a butterfly valve having a hollow valve body with an inlet, an outlet, and a cylindrical flow channel with a wall passing between the inlet and the outlet, a rotatable operating stem passing laterally through the hollow valve body and cylindrical flow channel of the hollow valve body at a location between the inlet of the hollow valve body and the outlet of the hollow valve body, a vane with a vane seat formed about a circumference of the vane, the vane being located in the cylindrical flow channel of the hollow valve body and mechanically coupled to the rotatable operating stem, and rotatable from a first orientation perpendicular to a flow direction between the inlet of the hollow valve body and the outlet of the hollow valve body and a second orientation away from perpendicular to the flow direction between the inlet of the hollow valve body and the outlet of the hollow valve body, the valve seal arrangement comprising:
a) a seal flange extending radially into the cylindrical flow channel of the hollow valve body from the wall of the cylindrical flow channel of the hollow valve body adjacent to the vane seat of the vane when the vane is in the first orientation;
b) a seal channel with a first side, a second side, and a third side formed in the wall of the cylindrical flow channel of the hollow valve body, the first side being adjacent to the seal flange, the second side being recessed into the wall of the cylindrical flow channel of the hollow valve body, and the third side being opposite the first side;
c) an annular seal retaining ring having a plurality of tabs extending from an outer circumference of the annular seal retaining ring into the seal channel, with an interface between the tabs and the third side of the seal channel holding the annular seal ring in the cylindrical flow channel of the hollow valve body opposite the seal flange and defining a space between the annular seal ring and the seal flange; and
d) an elastomeric seal held in the seal channel between the annular seal retaining ring and the seal flange, with the elastomeric seal extending into the cylindrical flow channel through the space defined between the annular seal ring and the seal flange and forming a seal surface held in compression against the vane seat of the vane when the vane is in the first orientation;
wherein the annular seal retaining ring has a retaining ring outer diameter, the inlet has an inlet diameter, and the retaining ring outer diameter is smaller than the inlet diameter.

* * * * *